Patented Dec. 20, 1949

2,491,913

UNITED STATES PATENT OFFICE 2,491,913

RUBBER COMPOSITIONS CONTAINING UNSUBSTITUTED ROSIN AMINES

Lyle O. Amberg, Wilmington, Del., assignor to Hercules Powder Company, Wilmington, Del., a corporation of Delaware No Drawing. Application June 1, 1946,
Serial No. 673,397

12 Claims. (Cl. 260—27)

This invention relates to rubber compositions and, more particularly, to rubber compositions containing a rosin derivative.

It has been known that ordinary rosin may be used in the compounding of rubber. According to methods frequently employed in the art, either a natural wood or a natural gum rosin may be added to rubber, as by milling, for the preparation of compositions which may find use as adhesives. Natural wood or gum rosin also has been added to rubber during the compounding stage prior to vulcaniztion along with other desired ingredients such as vulcanizing agents, accelerators, fillers, and the like. In the case of a rubber which is to be vulcanized, one important function of the rosin is to soften, or plasticize, the rubber composition on the rolls of the mill, rendering the composition more susceptible to mechanical working, and thereby rendering the milling process less expensive and more efficient. Although the use of ordinary rosin is advantageous from this point of view, the presence of rosin in the final rubber composition imparts to the latter certain undesirable characteristics, one of the most important of these being that the rubber composition exhibits considerable reactivity toward atmospheric oxygen.

It also is well known to use amines and derivatives of amines with rubber during the process of vulcanization. Such amines and their derivatives serve a useful purpose as accelerators, activators of accelerators, and, in a few instances, as antioxidants. Aniline, for example, was once widely used as an accelerator of vulcanization but has been abandoned largely because of its toxicity. At the present time amine derivatives such as diphenyl guanidine, di-o-tolyl guanidine, thiocarbanilide, thiuram disulfides, N-cyclohexyl-2-benzothiazole sulphenamide, piperidinium pentamethylene dithiocarbamate, aldehyde-amine and ketone-amine condensates are widely used in vulcanized rubber products. The need has long been felt, however, for a material which would combine the plasticizing effect of rosin with the accelerating and activating effects of the various amines and their derivatives.

In accordance with this invention, it has been found that rubber compositions having valuable and improved properties may be obtained if there is used as a compounding agent a rosin derivative selected from the group consisting of an amine derived from a rosin and a weak organic acid salt of an amine derived from a rosin. In accordance with this invention, compositions may be prepared which, in the unvulcanized state, possess improved processing properties such as improved plasticity, softness, and tack, and which cure more quickly to vulcanizates with improved properties such as increased resistance to heat embrittlement and resistance to oxidation. If the rubber is to be vulcanized, it is compounded with a vulcanizing agent and an amine derived from a rosin, or a weak organic acid salt of an amine derived from a rosin, and then vulcanized according to standard procedures. In addition to the rosin amine and the vulcanizing agent, there may be employed fillers, pigments, activators, and similar materials customarily employed by the art to modify the properties of the vulcanized composition or to facilitate its preparation, in such kind and quantity as may be necessary to obtain the particular desired qualities in the final product.

In order to present certain specific embodiments of the invention which has been described broadly in the preceding paragraphs, the following table contains examples of formulations which may be employed in accordance with this invention. In the examples shown by this table and in the examples thereafter, all quantities of ingredients are in parts by weight unless otherwise specified.

*Table I*

| Example Number | 1 | 2 | 3 |
|---|---|---|---|
| GR-S synthetic rubber | 25 | 25 | 25 |
| Stearic acid | 0.25 | 0.25 | 0.25 |
| Zinc oxide | 1.25 | 1.25 | 1.25 |
| Carbon black | 12.5 | 12.5 | 12.5 |
| Sulfur | 0.5 | 0.5 | 0.5 |
| Santocure | 0.45 | 0.45 | |
| Captax | | 0.28 | |
| Hydroabietylamine | 1.0 | 0.5 | 2.0 |
| N wood rosin | 2.5 | | |

The following designations apply to the materials used in the compositions of Table I: GR-S synthetic rubber (Government Standard copolymer of 75 parts butadiene and 25 parts styrene), stearic acid (Stearex beads), zinc oxide (XX Red 4), carbon black (channel black), sulfur (micronized), Santocure (N-cyclohexyl-2-benzothiazole sulphenamide), Captax (2-mercaptobenzothiazole.

In the preparation of the compositions of Table I, a master batch was first prepared starting with the total synthetic rubber required for the three examples. The master batch was milled eight minutes while circulating cool water through the rolls, and the materials common to all of the examples were added in the following order: stearic acid, zinc oxide, carbon black, and sulfur. After each material was incorporated, the sheet was twice cut in from each side two-thirds of the way across. After all of the sulfur was in, the sheet was cross-cut two-thirds of the way across twelve times from each side and then cut off and end-rolled twelve times. The material was then allowed to form a band and sheeted off. The master batch then was divided into three equal portions, each portion was placed separately on cool rolls, and the remaining components necessary in each example were added. After thorough mixing on the rolls, the completed compositions were sheeted off and allowed to stand overnight. Suitable portions were cut out of each sheet and cured at 280° F. for 10, 30, 60, and 90 minutes, respectively.

It was found that the rubber prepared according to Example 1 cured more rapidly than either a corresponding rubber containing no hydroabietylamine or one containing no N wood rosin or hydroabietylamine. In the case of Example 2, it was found that the presence of the hydroabietylamine reduced the time required to effect vulcanization as compared to other rubbers activated by a mercaptobenzothiazole. Example 3 showed that hydroabietylamine was effective as the sole accelerator during vulcanization and also that the presence of the amine produced a softer unvulcanized stock with improved building tack.

*Table II*

| Example Number | 4 | 5 | 6 | 7 |
|---|---|---|---|---|
| GR-S synthetic rubber | 250 | 250 | 250 | 300 |
| Stearic acid | 2.5 | 2.5 | 2.5 | 3 |
| Santocure | 4.5 | 4.5 | 4.5 | 5.4 |
| Zinc oxide | 12.5 | 12.5 | 12.5 | 15 |
| Precipitated salt of hydroabietylamine and hydrogenated rosin | 25 | | | |
| Fused mixture of hydroabietylamine (20 parts) and hydrogenated rosin (80 parts) | | 25 | | |
| Fused mixture of dehydroabietylamine (25 parts) and dehydrogenated rosin (75 parts) | | | 25 | |
| Hydrogenated rosin | | | | 22.5 |
| Hydroabietylamine | | | | 7.5 |
| Carbon black | 125 | 125 | 125 | 150 |
| Sulfur | 5 | 5 | 5 | 6 |

The compositions set forth in Table II were formed by running each synthetic rubber sample through milling rolls once at 100° F. and allowing a sheet to form on the front roll. Cold water was then passed through the rolls and milling allowed to continue for eight minutes, the band being cut once each way each minute. The stearic acid, Santocure, and zinc oxide were added in that order, the band being cut between the addition of each reagent. The next step in each example was the addition of the particular rosin amine composition. Each band then was cross-rolled six times, the mill opened to form a low bead, and the carbon black added. When all of the carbon black was in, the sulfur was added without cutting. The compounded sheet was then cross-cut twelve times each way and cross-rolled twelve times. The rubber sample, after cooling to room temperature, was refined five times through tight rolls and then was sheeted off to give a sheet of about 0.075 inch in thickness. After standing overnight, samples of each material were cured for 30, 60, 90, and 120 minutes, respectively, at 280° F.

The composition of Example 4 cured rapidly to a vulcanizate with good tensile properties and outstanding resistance to heat embrittlement. The composition of Example 5 was quite comparable to that of Example 4 even though a much smaller proportion of hydroabietylamine was present in comparison to the amount of hydrogenated rosin. The composition shown by Example 6 gave a vulcanizate having good building tack and resistance to extended heat embrittlement. Example 7 indicated that the hydroabietylamine and the hydrogenated rosin need not be in the form of a fused mixture in order to obtain the beneficial effects since, in Example 7, the two rosin components were added separately during the compounding procedure.

*Table III*

| Example Number | 8 | 9 | 10 |
|---|---|---|---|
| Crude natural rubber (No. 1 Smoked Sheets) | 300 | 300 | 300 |
| Santocure | 1.98 | 1.98 | 1.98 |
| Carbon black | 150 | 150 | 150 |
| Stearic acid | 9.75 | 9.75 | 9.75 |
| Zinc oxide | 15 | 15 | 15 |
| Fused mixture of hydroabietylamine (25 parts) and hydrogenated rosin (75 parts) | 6 | | |
| Hydrogenated rosin | | 4.5 | |
| Hydroabietylamine | | 1.5 | |
| N wood rosin amine | | | 1.5 |
| N wood rosin | | | 4.5 |
| Sulfur | 7.5 | 7.5 | 7.5 |

In the preparation of the compositions of Table III, the rubber was placed on rolls held at 158° F., the rubber being allowed to break down until running smooth. The compounding ingredients were then added as rapidly as possible in the following order: (1) accelerators, (2) carbon black, (3) fillers, (4) rosin compounds, (5) sulfur. After all of the ingredients were incorporated, the batch was cut each way six times and cross-rolled six times, after which the batch was sheeted off to give a sheet about 0.085 inch in thickness. The sheets were allowed to stand overnight. Suitable portions were cut out of each sheet and cured at 280° F. for 45, 60, and 90 minutes, respectively. Each portion then was cut into dumb-bell samples with a type "C" die (A. S. T. M. No. D412–41). One-half of the specimens prepared from each sample were aged for 24 hours at 212° F. in an air oven and tested simultaneously with the unaged specimens on a Scott L6 rubber tester, jaws separating 20 inches per minute.

The natural rubber vulcanizates prepared according to Examples 8, 9, and 10 had good tensile properties and outstanding resistance to heat embrittlement. The properties of elongation at break and modulus of elasticity also were entirely satisfactory.

The process in accordance with this invention is carried out in the presence of an amine derived from a rosin or a weak organic acid salt of an amine derived from a rosin. Any rosin may be employed to prepare the amines which are used in the process of this invention. The amines may be derived, in other words, from various rosins and modified rosins. Thus, in place of the N wood rosin amine used in Example 10, there may be used an amine prepared from any wood or gum rosin or the pure acids contained therein such as abietic and pimaric acids. The modified rosin amines shown by the examples have been dehydroabietylamine and hydroabietylamine, but the amines derived from other modified rosins such as polymerized rosin, heat-treated rosin, isomerized rosin, and the like, also are operable. The modified rosin amines may be derived not only from the pure acids such as dehydroabietic, dihydroabietic, and tetrahydroabietic contained in the various modified rosins, but also from materials containing these acids such as dehydrogenated rosin, hydrogenated rosin, etc.

Hydroabietylamine and dehydroabietylamine, for example, are ultimately derived from hydrogenated and dehydrogenated rosin, respectively. The hydrogenated rosin is prepared by contacting a natural rosin or rosin acid in a fluid state with hydrogen in the presence of an active hydrogenation catalyst, such as activated nickel, Raney nickel, copper chromite, cobalt, platinum, platinum oxide, and the like. Many variations of the hydrogenation reaction may be utilized.

The dehydrogenated rosin is obtained by the dehydrogenation or disproportionation of natural rosin or a rosin material containing a substantial amount of a natural rosin, such as gum or wood rosin. The dehydrogenation or disproportionation reaction is carried out by contacting the rosin or rosin material at an elevated temperature, in the absence of added hydrogen, with an active hydrogenation catalyst, such as palladium, platinum, nickel, copper chromite, etc., to effect a dehydrogenation or disproportionation reaction. The catalysts may be supported on a carrier, such as alumina, fibrous asbestos or activate charcoal.

The natural rosin may be refined by any means, such as by crystallization, by means of a selective solvent such as furfural or phenol, or by an adsorbent earth such as fuller's earth, prior to its use in the preparation of an amine derived from rosin, or prior to its use in the preparation of a modified rosin, such as hydrogenated or dehydrogenated rosin. The hydrogenated, dehydrogenated, or other modified rosin also may be refined, as by distillation or other means prior to their use in the preparation of the corresponding amines.

The next step in the transformation of any of the rosins or acids thereof to the corresponding amine is the conversion of the rosin material to the corresponding nitrile. The reaction may be carried out by passing gaseous ammonia into the molten rosin material and vaporizing the water as fast as it is formed in order to remove the water from the reaction mixture. The nitriles also may be formed by heating the rosin material with ammonia in the presence of a dehydration catalyst. The nitriles then should be purified by neutralization and distillation before subjecting them to hydrogenation in order to produce the corresponding amines.

The hydrogenation of the nitriles may be carried out either in the presence or absence of ammonia, since the presence of ammonia is not necessary to prevent the formation of secondary amines. Any active hydrogenation catalyst, such as nickel, cobalt, Raney nickel, Raney cobalt, active platinum, palladium, palladium on carbon, or reduced platinum oxide, may be used in the hydrogenation reaction. The nitriles to be hydrogenated should be essentially free of acids to prevent destruction of the catalyst and also to prevent color in the product and a lower yield. The hydrogenation of the nitrile may be carried out in a batch or continuous process, and the amine may be recovered and purified by conventional procedures.

The amine prepared from the nitrile of rosin is a mixture of the amines of the various rosin acids present in rosin. That from hydrogenated rosin is a mixture of dihydroabietylamine and tetrahydroabietylamine, since hydrogenated rosin is a mixture of hydrorosin acids. The proportion of dihydro derivative to tetrahydro derivative is dependent upon the degree of hydrogenation of the rosin in the preparation of the hydrogenated rosin. If either the pure dihydroabietylamine or tetrahydroabietylamine is desired, they may be separated from the mixture or they may be prepared by the hydrogenation of the corresponding di- or tetra-hydroabietonitrile. In the same way, pure dehydroabietylamine may be prepared by the hydrogenation of pure dehydroabietonitrile. It is desirable that the amine used be of high purity in order to obtain maximum efficiency, although products containing some nitrile are operable.

The examples have shown various ways in which the rosin amines may be used in accordance with this invention. The amine may be utilized as in Example 3 as the sole softening and accelerating agent or it may be used as in Example 2 in conjunction with conventional accelerators. Additional softening agents such as the N wood rosin shown in Example 1 also may be added to the composition. As shown in Examples 4 to 10, it may be desirable to use the rosin amine in conjunction with the particular rosin compound from which it ultimately was derived, but it is not necessary that the particular rosin compound from which the amine was derived be utilized. Either dehydrogenated rosin or N wood rosin, for example, could be used in preparation of a precipitated salt of hydroabietylamine which would be comparable to the precipitated salt used in Example 4. In general, when using a combination of a rosin amine and a rosin, these components may be added separately during the compounding operation or may be added in combination in the form of a precipitated salt of the amine and the rosin compound or as a fused mixture thereof. The fused mixture takes the form of a salt of the amine and the rosin. Although the fused mixtures shown in Examples 5 and 6 were in the ratios of 20:80 and 25:75 rosin amine: rosin acid, the ratio may be varied from 12.5:37.5 to 50:50. On the basis of performance and cost, however, the most desirable ratio is 75:25.

Although Examples 4, 5, 6, and 8 have shown only those amine salts prepared by precipitation or fusion of the amines with certain rosins, which are weak organic acids, other such acidic materials may be utilized in preparation of the amine salts operable in accordance with this invention. Examplary of such materials are polymerized rosin, heat-treated rosin, isomerized rosin, the pure acids contained in such rosin, and the like. According to Holleman (A Textbook of Organic Chemistry by A. F. Holleman, 5th English edition (1920), John Wiley & Sons Inc., page 117) "the 'strength' of acids depends upon their degree of ionization, strong acids undergoing considerable and weak acids but slight ionization." The degree of ionization is expressed in terms of dissociaiton constants. The dissociation constant of stearic acid of the examples, for example, is $1.7 \times 10^{-6}$ at 35° C. or $2.6 \times 10^{-6}$ at 50° C. (N. P. Datta, Journal of the Indian Chemical Society, vol. 16, No. 11, November 1939, page 573). Salts of the amines also may be prepared from such weakly acidic materials as the 2-mercaptobenzothiazole used in some of the examples as an accelerator. The rosin amines all form salts with mercaptobenzothiazole, and this affords a simple means of introducing both the amine and an additional accelerator simultaneously to the rubber composition. The amine salts of mercaptobenzothiazole act as efficient accelerators of vulcanization, giving tire tread stocks which are improved in resistance to hot flex cut growth after extended accelerated aging.

The amount of amine utilized, in preparation of the rubber composition may be from about 0.05 to about 20% based upon the weight of the rubber. Upon this basis the preferable amount is from about 0.1 to about 10%. When the amine is used in the form of a salt of a weak organic acid, the amount of the salt will be that which will be equivalent to the desired amount of amine, calculated as the free amine. The amount of amine used will generally vary depending upon the type of rubber, the nature of the composition, the function of the rosin amine, and the properties desired in the product. In general, the synthetic rubbers such as those derived from the copolymerization of butadiene and styrene will require somewhat larger amounts of the rosin amine than does natural rubber, since synthetic rubbers usually necessitate a stronger acceleration during vulcanization.

The examples have shown the use of various rosin amines, or their salts with weak organic acids, in the compounding of natural rubber and GR-S synthetic rubber, the latter being a copolymer of butadiene-1,3 and styrene. The process of this invention may be applied, however, to other synthetic rubberlike polymers, such as those prepared by polymerizing diolefins, halogenated derivatives of diolefins or other substituted diolefins, or by copolymerizing diolefins with other compounds containing a vinyl group, such as styrene, acrylic acid esters, and acrylic acid nitrile. More specifically, the rubberlike polymers may be those obtained by polymerizing the conjugated butadiene hydrocarbons, butadiene and its derivatives, such as isoprene, dimethyl butadiene and chloroprene, or by copolymerizing, for example, butadiene and styrene or acrylonitrile, or isoprene and styrene or acrylonitrile. The commercial synthetic rubbers to which the process of this invention is particularly applicable are: GR-S (butadiene-styrene copolymer), GR-N (butadiene-acrylonitrile copolymer), and GR-I (butadiene-isobutylene or isoprene-isobutylene copolymer).

The usual fillers, reinforcing agents, antioxidants, vulcanizers, extenders, plasticizers, softeners, processing aids, as well as other activators and accelerators well known in the preparation of natural rubber and synthetic rubber compositions, may be employed in accordance with this invention. Thus, the fillers which may be employed are, for example, aluminum flake, antimony sulfide, asbestos, barium sulfate, cadmium sulfide, appropriate grades of carbon black, chromic oxide, clay, such as bentonite, cotton linters, iron oxide, lime, litharge, lithopone, magnesium carbonate, or oxide, silica, slate flour, talc, titanium oxide, whiting, zinc oxide, zinc sulfide, or the like. Zinc oxide, reinforcing grades of carbon black, and the like, may be employed as reinforcing agents. Preferably, a mixture of suitable fillers and reinforcing agents is employed to give to the compositions the particular properties which may be desired. Thus, a mixture of zinc oxide and carbon black may be employed in the manner illustrated by the examples. Suitable pigments, such as ultramarine, vermillion, or the like may be empuloyed to impart to the composition a desired color.

The vulcanizing agent which is employed in accordance with this invention preferably is sulfur. However, in certain cases, selenium or tellurium may be employed either alone or in conjunction with sulfur in order to obtain desirable modifications of the characteristics of the composition in respect to the vulcanization process. In the event that the traces of these vulcanizing agents may be objectionable in the vulcanized product, a peroxide vulcanizing agent, such as benzoyl peroxide, may be employed.

As a means for obtaining vulcanization of the composition at lower temperatures or for increasing the rate of vulcanization, suitable accelerators may be employed. Accelerators which are familiar to the art are, in general, satisfactory. Thus, in place of the accelerators employed in the examples, there may be employed accelerators, such as di-o-tolyl guanidine, ethylidine guanidine, hexamethylenetetramine, methylene aniline, tetramethylthiuram disulfide, thiocarbanilide, diphenylamine, diphenyl guanidine, tetramethylthiuram monosulfide, triethyltrimethylenetriamine, triphenyl guanidine, and the like. The effects of these various accelerators and of accelerators which are equivalent thereto, upon the vulcanization of the composition and upon its properties after vulcanization may vary somewhat, in a manner known to the art, and thereby provide means for controlling certain of the properties of the vulcanized product. Although additional control of the characteristics may be desirable in certain circumstances, in general the use of mercaptobenzothiazole or of N-cyclohexyl-2-benzothiazole sulphenamide has been found to be preferable.

In general, because of the marked stability of the present compositions to the effects of exposure to the atmosphere, the use of powerful antioxidants is not so essential as in the case of rubber compounded with ordinary rosin. However, in the event that it is desirable further to decrease the effects of oxidation on the rubber, suitable antioxidants may be added. Suitable antioxidants are, for example, diphenylamine, aldo-α-naphthylamine, diphenylethylene diamine, phenyl-α-naphthylamine, or phenyl-β-naphthylamine. In case a commercial synthetic rubber to which antioxidants normally are added during preparation is employed, the amount of antioxidant added during the compounding of the present compositions may be decreased suitably.

The use of the various fillers, antioxidants, and the like hereinbefore mentioned is well understood by those skilled in the art and, in general, these compounding ingredients may be employed in the manner customarily employed by the art.

Vulcanized products prepared in accordance with the present invention have been found to be of particular value as tire treads. The compositions also are of value in the manufacture of other articles, such as tire carcass stocks, inner tubes, rubber hose, rubber-lined hose, footwear, electrical insulator goods, molded rubber articles, and the like. The improved processing characteristics, such as plasticity, of the present compositions prior to vulcanization facilitate significantly their compounding as well as subsequent operations such as extrusion molding and the like. During vulcanization, the present compositions exhibit a faster rate of cure than do comparable compositions containing no rosin amine. The rosin amine, during the vulcanization process, may serve as the sole accelerator or as an activator of another accelerator or as a means of overcoming the cure-retarding effect of rosin softeners. The improved characteristics of the vulcanized product are apparent in their increased tensile strength, increased resistance to oxidation, increased resistance to embrittlement upon aging, improved compression set, and improved heat-buildup properties.

What I claim and desire to protect by Letters Patent is:

1. A rubber composition comprising a conjugate diolefin polymer and a material of the group consisting of an unsubstituted rosin amine and a salt of an unsubstituted rosin amine and an organic acid having a dissociation constant equal to about $1.7 \times 10^{-6}$ at 35° C. or $2.6 \times 10^{-6}$ at 50° C., the weight of said rosin amine in the composition amounting to about 0.05 to about 20% of the weight of said conjugate diolefin polymer.

2. A rubber composition comprising a conjugate diolefin polymer and an unsubstituted rosin amine, the weight of said rosin amine in the composition amounting to about 0.05 to about 20% of the weight of said conjugate diolefin polymer.

3. A rubber composition comprising a conjugate diolefin polymer and a salt of an unsubstituted rosin amine and an organic acid having a dissociation constant equal to about $1.7 \times 10^{-6}$ at 35° C. or $2.6 \times 10^{-6}$ at 50° C., the weight of said rosin amine in the composition amounting to about 0.05 to about 20% of the weight of said conjugate diolefin polymer.

4. A rubber composition comprising a conjugate diolefin polymer and a salt of an unsubstituted dehydrogenated rosin amine and an organic acid having a dissociation constant equal to about $1.7 \times 10^{-6}$ at 35° C. or $2.6 \times 10^{-6}$ at 50° C., the weight of said rosin amine in the composition amounting to about 0.05 to about 20% of the weight of said conjugate diolefin polymer.

5. A rubber composition comprising a conjugate diolefin polymer and a salt of dehydroabietylamine and an organic acid having a dissociation constant equal to about $1.7 \times 10^{-6}$ at 35° C. or $2.6 \times 10^{-6}$ at 50° C., the weight of said dehydroabietylamine in the composition amounting to about 0.05 to about 20% of the weight of said conjugate diolefin polymer.

6. A rubber composition comprising a conjugate diolefin polymer and a salt of an unsubstituted hydrogenated rosin amine and an organic acid having a dissociation constant equal to about $1.7 \times 10^{-6}$ at 35° C. or $2.6 \times 10^{-6}$ at 50° C., the weight of said rosin amine in the composition amounting to about 0.05 to about 20% of the weight of said conjugate diolefin polymer.

7. A rubber composition comprising a conjugate diolefin polymer and a salt of hydroabietylamine and an organic acid having a dissociation constant equal to about $1.7 \times 10^{-6}$ at 35° C. or $2.6 \times 10^{-6}$ at 50° C., the weight of said hydroabiethylamine in the composition amounting to about 0.05 to about 20% of the weight of said conjugate diolefin polymer.

8. A rubber composition comprising a copolymer of butadiene-1,3 and styrene and a salt of dehydroabietylamine and an organic acid having a dissociation constant equal to about $1.7 \times 10^{-6}$ at 35° C. or $2.6 \times 10^{-6}$ at 50° C., the weight of said dehydroabietylamine in the composition amounting to about 0.05 to about 20% of the weight of said copolymer.

9. A rubber composition comprising natural rubber and a salt of hydroabietylamine and an organic acid having a dissociation constant equal to about $1.7 \times 10^{-6}$ at 35° C. or $2.6 \times 10^{-6}$ at 50° C., the weight of said hydroabietylamine in the composition amounting to about 0.05 to about 20% of the weight of said natural rubber.

10. A vulcanized rubber composition obtained by vulcanizing a mixture comprising a conjugate diolefin polymer and a material of the group consisting of an unsubstituted rosin amine and a salt of an unsubstituted rosin amine and an organic acid having a dissociation constant equal to about $1.7 \times 10^{-6}$ at 35° C. or $2.6 \times 10^{-6}$ at 50° C., the weight of said rosin amine in the mixture amounting to about 0.05 to about 20% of the weight of said conjugate diolefin polymer.

11. A tire tread stock comprising a conjugate diolefin polymer, a vulcanizing agent, a reinforcing agent, and a material of the group consisting of an unsubstituted rosin amine and a salt of an unsubstituted rosin amine and an organic acid having a dissociation constant equal to about $1.7 \times 10^{-6}$ at 35° C. or $2.6 \times 10^{-6}$ at 50° C., the weight of said rosin amine in the stock amounting to about 0.05 to about 20% of the weight of said conjugate diolefin polymer.

12. The process of preparing a rubber composition comprising vulcanizing a conjugate diolefin polymer in the presence of a material of the group consisting of an unsubstituted rosin amine and a salt of an unsubstituted rosin amine and an organic acid having a dissociation constant equal to about $1.7 \times 10^{-6}$ at 35° C. or $2.6 \times 10^{-6}$ at 50° C., the weight of said rosin amine in the composition amounting to about 0.05 to about 20% of the weight of said conjugate diolefin polymer.

LYLE O. AMBERG.

REFERENCES CITED

The following references are of record in the file of this patent:

UNITED STATES PATENTS

| Number | Name | Date |
|---|---|---|
| 1,776,857 | Humphrey | Sept. 30, 1930 |
| 1,784,703 | Morton | Dec. 9, 1930 |
| 2,218,284 | Hovey | Oct. 15, 1940 |
| 2,367,001 | Campbell | Jan. 9, 1945 |
| 2,371,736 | Carson | Mar. 20, 1945 |
| 2,377,647 | Pragoff | June 5, 1945 |